(12) United States Patent
Chen et al.

(10) Patent No.: US 6,788,470 B2
(45) Date of Patent: Sep. 7, 2004

(54) LIGHT COLLIMATING SYSTEM

(76) Inventors: Shih-Chou Chen, No. 51, Lane 165, Ming-Hsiang Street, Hsinchu (TW); Chung-Kuang Shieh, No. 24, Alley 27, Lane 247, Sec. 2, Tienhsin Rd., Feng-Yuan City, Taichung (TW); Chih-Han Fang, No. 15, Kuang Fu Rd., Hsinchu Industrial Park, Hsinchu Hsien (TW)

( * ) Notice: Subject to any disclaimer, the term of this patent is extended or adjusted under 35 U.S.C. 154(b) by 8 days.

(21) Appl. No.: 10/262,198

(22) Filed: Sep. 30, 2002

(65) Prior Publication Data

US 2004/0061950 A1 Apr. 1, 2004

(51) Int. Cl.⁷ .......................... G02B 27/30; G02B 3/02; G02B 13/18; G02B 6/00; G09G 3/00
(52) U.S. Cl. .................... 359/641; 359/709; 362/31; 362/551
(58) Field of Search .................. 359/641, 619, 359/625–627, 707–709; 362/31, 551, 558, 561

(56) References Cited

U.S. PATENT DOCUMENTS 5,359,691 A * 10/1994 Tai et al. .................... 362/561
5,854,872 A * 12/1998 Tai .............................. 362/551
6,007,225 A * 12/1999 Ramer et al. ............... 362/551

* cited by examiner

Primary Examiner—Georgia Epps
Assistant Examiner—Alicia M. Harrington
(74) Attorney, Agent, or Firm—Pro-Techtor International Services (57) ABSTRACT

A light collimating system includes a transparent substrate, a plurality of conic elements and a screen. Each of the conic elements has a relatively narrow light incident side to which the screen is attached and a relatively wide light emitting side attached to the transparent substrate. Each of the conic elements has several segments which are arranged to form a truncated cone with an opening angle that decreases towards the light emitting side. The screen has a plurality of transmission areas covered by the light incident sides of the conic elements. Outside the transmission areas, incoming light is reflected from the screen. Diffuse light entering the conic elements through the transmission areas of the screen is collimated by refraction and total reflection at peripheral surfaces of the conic elements, resulting in a light bundle of narrow angular intensity distribution emanating from the transparent substrate.

20 Claims, 10 Drawing Sheets

LIGHT COLLIMATING SYSTEM

BACKGROUND OF THE INVENTION

1. Field of the Invention

The present invention relates to the technical field of collimating plates for collimating diffused light and of backlighting devices, particularly to a light collimating system and a collimated light source for backlighting a liquid crystal display.

2. Description of Related Art

Liquid crystal displays (LCDs) have increasingly replaced cathode ray tubes as display devices for computers, their main advantages being small thickness, low weight and low energy consumption. For many applications, e.g. medical diagnosis and space technology, it is desirable to have images of high contrast displayed at a large range of viewing angles. While original designs were unsatisfactory in this respect, more recent designs of LCDs provide a backlighting system generating collimated light which, having passed through an LCD panel, is dispersed by a diffusing plate, offering an improved range of viewing angles.

Figure 2:
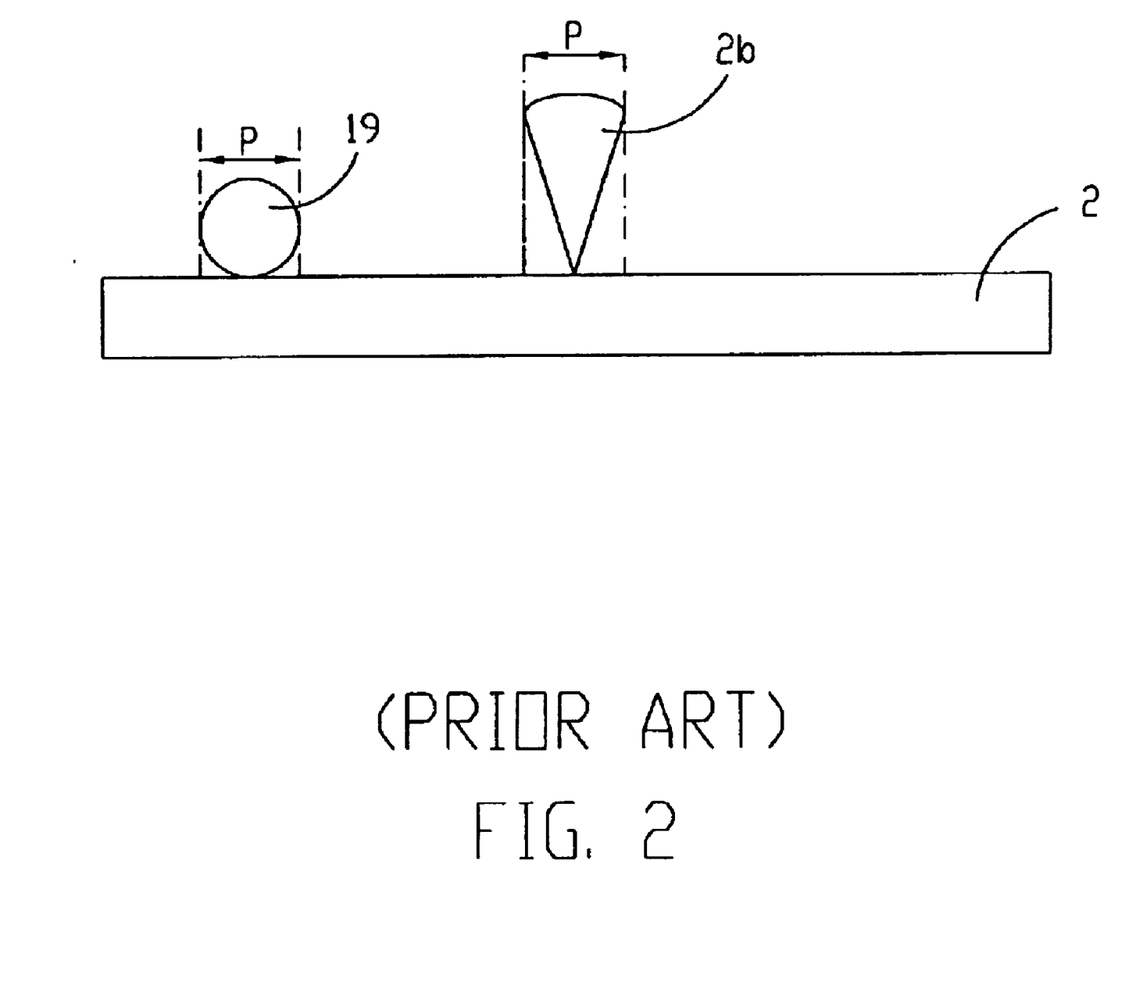
FIG. 2 (prior art) is a schematic illustration of various shapes of refractive elements.

Several designs of collimated light sources have been made, as shown in FIG. 2. U.S. Pat. No. 6,327,091 B1 teaches a plurality of light transmitting spheres 1a placed on a transparent support 2 in partial contact therewith at light transmitting areas, outside which passage of light is blocked, defining an open area ratio. Light passing from the transparent support 2 through the plurality of light transmitting spheres 1a is collimated by diffraction. A light utilization factor η is defined as the power of transmitted light over the power of incident light. An open area ratio of 0.03 results in η=0.079, of 0.05 in η=0.35. The open area ratio is adjusted for an optimum trade-off between transmitted intensity and collimation. An intensity halfwidth of about ±15° is achieved, as compared to an intensity halfwidth of about ±25° of previous devices. In another design taught in U.S. Pat. No. 5,839,812, collimation of light by diffraction is brought about by an array of cones 1b on a transparent support 2.

Collimated light sources according to U.S. Pat. Nos. 5,839,812 and 6,327,091 B1 offer only a low intensity efficiency of generated light. Furthermore, the design according to U.S. Pat. No. 5,839,812 is complicated, implying high manufacturing cost.

SUMMARY OF THE INVENTION

It is an object of the present invention to provide a light collimating system having a high yield of light intensity at a narrow angular intensity distribution.

Another object of the present invention is to provide a collimated light source which allows to maximize incident light intensity by having a reflecting light blocking area at a light incident side.

A further object of the present invention is to provide a collimated light source having a large illuminating area without requiring a light guide.

A further object of the present invention is to provide a collimated light source which admits a large variety of light sources, such as light bulbs, neon lamps, mercury-vapor lamps or cold or hot cathode ray sources, and allows for a variety of shapes of emitted light bundles for a wide range of applications.

The light collimating system of the present invention comprises a transparent substrate, a plurality of conic elements and a screen. Each of the conic elements has a relatively narrow light incident side to which the screen is attached and a relatively wide light emitting side attached to the transparent substrate. The screen has a plurality of transmission areas covered by the light incident sides of the conic elements. Outside the transmission areas, light is reflected from the screen. Diffuse light entering the conic elements through the transmission areas of the screen is collimated by refraction and total reflection at peripheral surfaces of the conic elements, resulting in a light bundle of narrow angular distribution emanating from the transparent substrate. The conic elements each have a single conic segment or a plurality of conic segments with opening angles that narrow towards the light emitting sides thereof. The shape of the conic elements ensures a high yield of light intensity at a narrow angular intensity distribution.

The present invention can be more fully understood by reference to the following description and accompanying drawings.

DETAILED DESCRIPTION OF THE PREFERRED EMBODIMENTS

Figure 1:
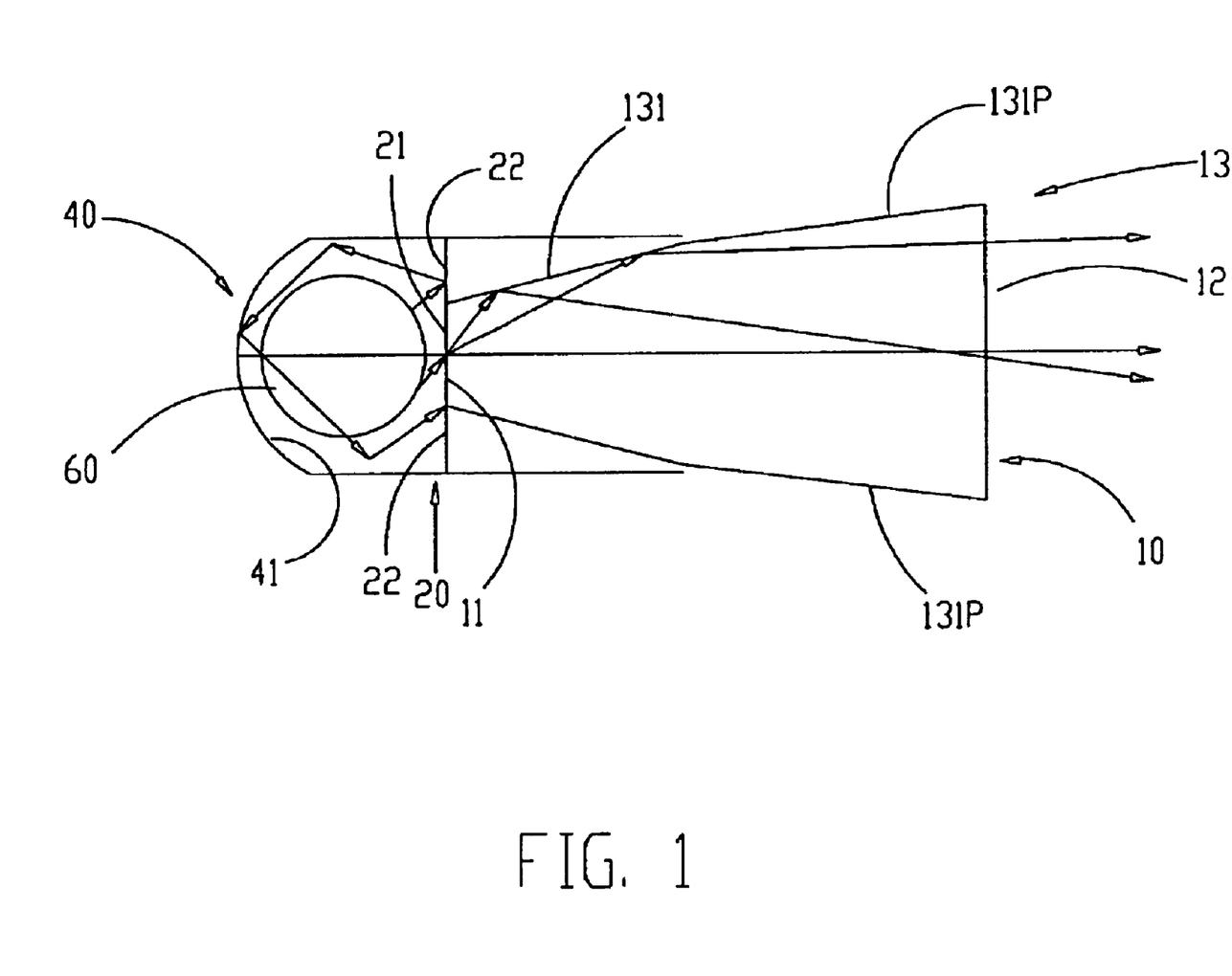
FIG. 1 is a sectional side view of the present invention in the first embodiment.

Referring to FIG. 1, the present invention in a first embodiment comprises a conic element 10 and a screen 20. The conic element 10 is made of material which has a refraction coefficient n and is shaped like a truncated cone, being symmetric around a longitudinal central axis and having a transverse flat light incident side 11, a larger flat light emitting side 12 opposite and parallel thereto, and a peripheral surface 13.

The light incident side 11 and the light emitting side 12 are of equal shapes, each being shaped like a strip, a rectangle, a square, a polygon, a circle, an oval or another shape. The light incident side 11 is smaller than the light emitting side 12. The conic element 10 has a single conic segment 131 or is divided into a plurality of conic segments 131P. The conic segments (131, 131P) share the peripheral surface 13, which is inclined against the central axis, having for each longitudinal position an opening angle 2α of between 1° and 60°.

Figure 3:
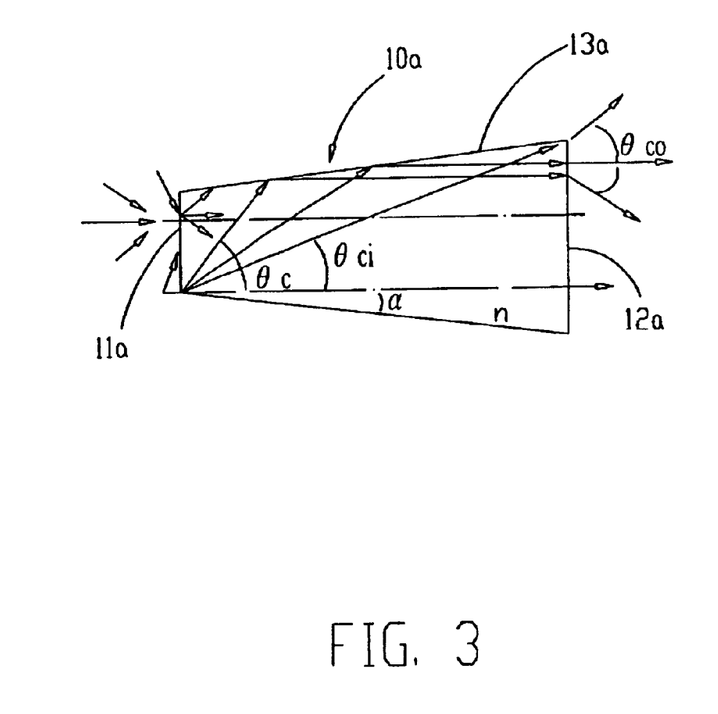
FIG. 3 is a schematic illustration of light diffraction and total reflection in a truncated cone having a single segment.

As shown in FIGS. 3, 4 and 5a–5d, the light collimating system of the present invention works by refraction and total reflection of light. FIG. 3 shows the paths of light rays passing through the conic element 10a, with the conic element 10a having a single conic segment 131. Any light ray entering the conic element 10a through the light incident side 11a thereof under an incident angle, as measured against the central axis, proceeds inside the truncated cone at a refractive angle according to Snell's law of optical refraction. The maximum refractive angle $\theta_c$, at grazing incidence, is given by $$\theta_c = \sin^{-1}(1/n).$$

As shown in FIG. 3, with $\alpha<\theta_c$, a light ray travelling inside the conic element 10a along the maximum refractive angle $\theta_c$ encloses an angle of $\theta_c-\alpha$ with the peripheral surface 13a and is reflected therefrom at an angle with respect to the central axis of $$\theta = \theta_c - 2\alpha, \text{ if } 2\alpha<\theta_c, \text{ or of}$$

$$\theta = 2\alpha - \theta_c, \text{ if } 2\alpha>\theta_c.$$

Finally, the light ray leaves the truncated cone at an emission angle of $$\theta_{co} = \sin^{-1}(n \sin \theta).$$

Figure 4:
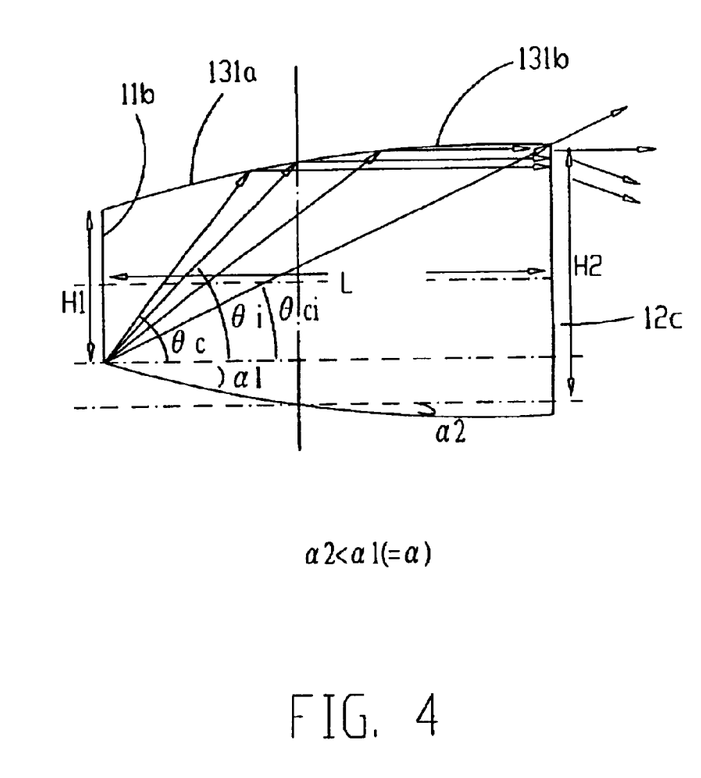
FIG. 4 is a schematic illustration of light diffraction and total reflection in a truncated cone having two segments.
Figure 5A:
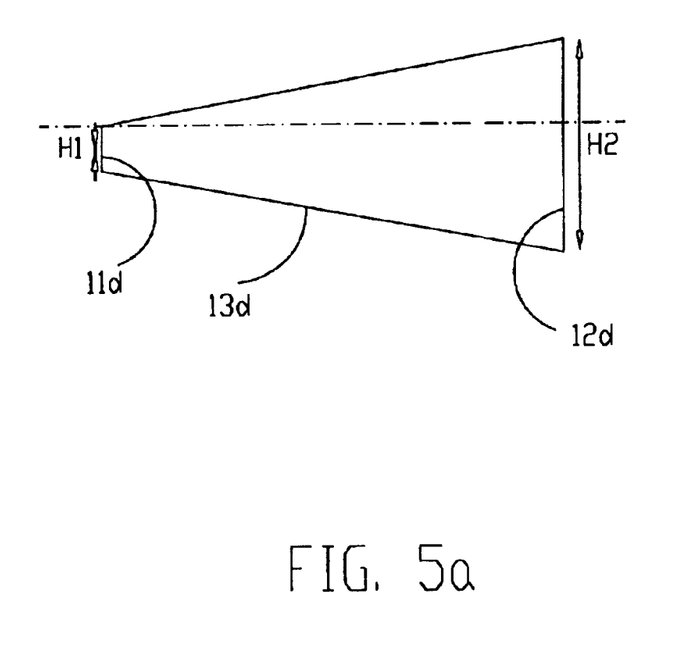
FIGS. 5a–5d are schematic illustrations of light diffraction and total reflection in a truncated cone having multiple segments or curved segments.
Figure 5B:
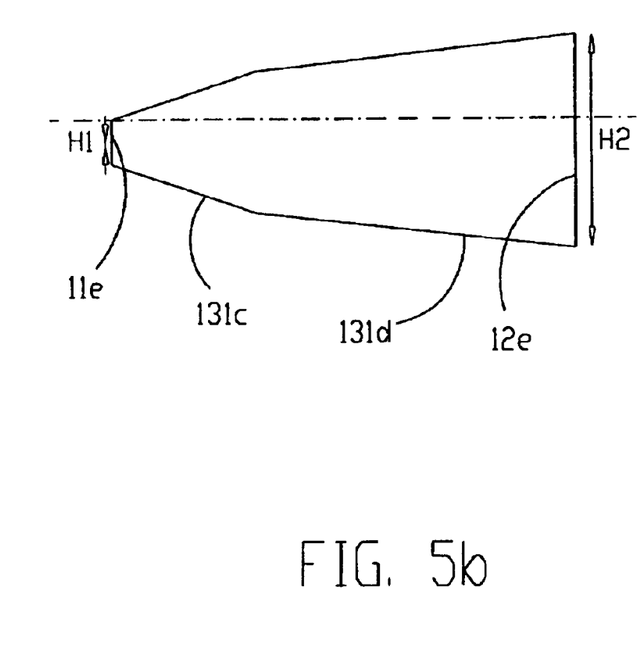
Figure 5C:
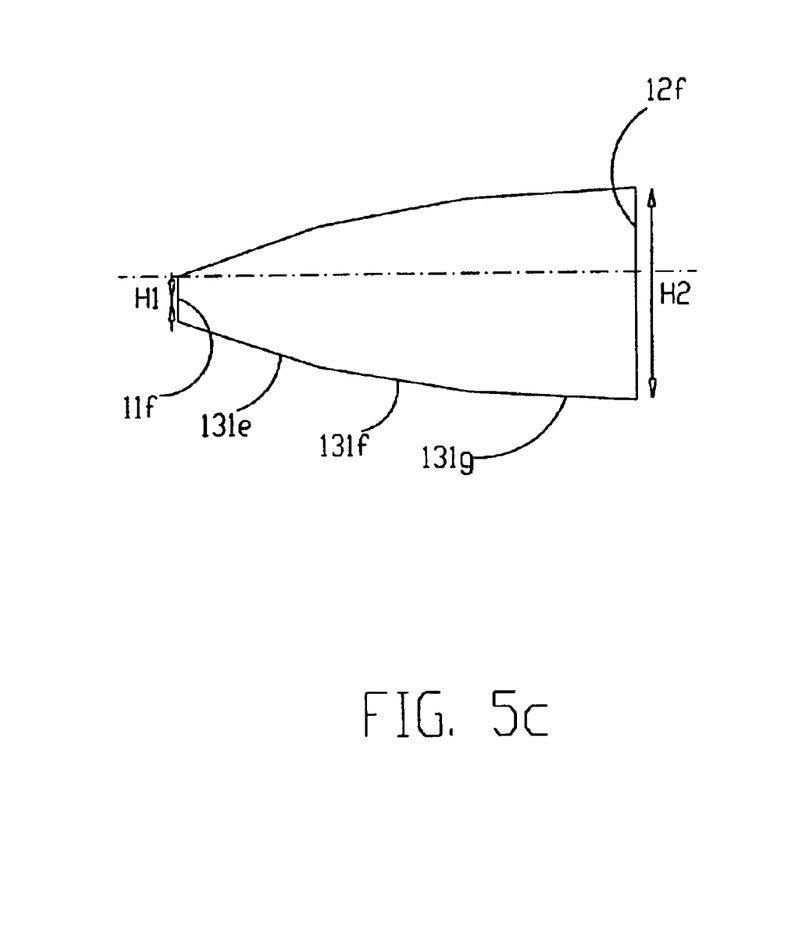
Figure 5D:
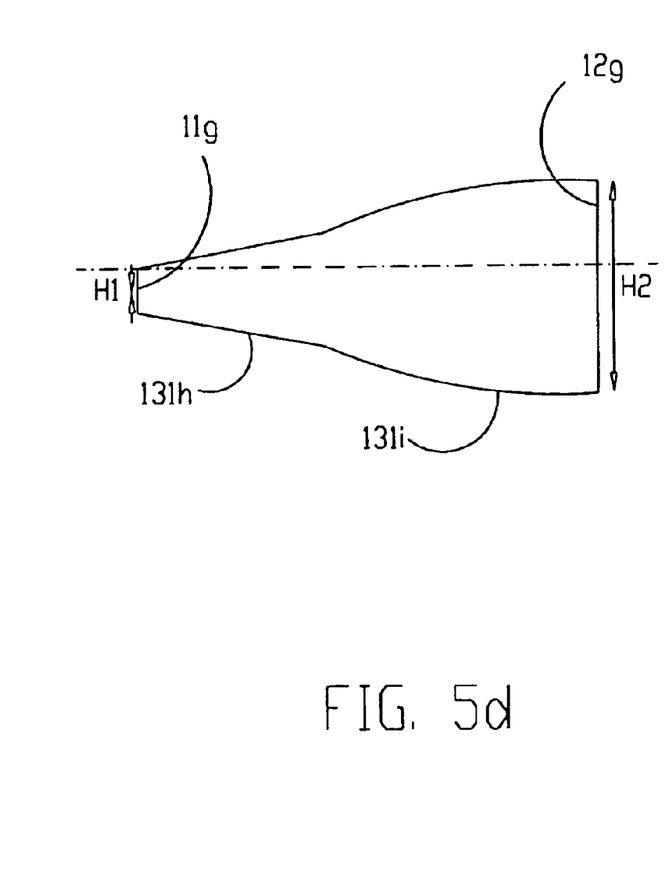

FIG. 4 shows light rays in the conic element, with the conic element consisting of two conic segments (131a, 131b) The two conic segments are truncated cones that are concentrically fitting on each other. The light incident side 11b of the conic element is formed by a top surface of a first conic segment 131a, having an area H1, and the light emitting side 12c of the conic element is formed by a base of a second conic segment 131b, having an area H2. The first and second conic segments (131a, 131b) have opening angles $\alpha_1$ and $\alpha_2$, respectively, with $\alpha_1>\alpha_2$. Using a refractive body with two conic segments reduces emission angles of light, resulting in better collimation of light.

This effect is made more pronounced by using multiple conic segments concentrically stacked onto each other or segments with curved peripheral surfaces that are bent towards the central axis, as shown in FIGS. 5a–5d, wherein 11d, 11e, 11f and 11g represent light incident sides; and 12d, 12e, 12f and 12g represent light emitting sides and 13d represents peripheral surface; and 131c, 131d, 131e, 131f, 131g and 131i represent conic segments.

Thus for any two neighboring conic segments, opening angles thereof differ, having smaller values closer to the light emitting side. Within each of the conic segments the opening angle either stays constant or decreases towards the light emitting side.

In the arrangement described above, a light utilization factor $$\eta \propto H1/H2$$

is achieved. Therefore, using a refractive body consisting of multiple conic segments or of curved conic segments, as described above, results in a higher light utilization factor.

The screen 20 is set on the light incident side 11 of the conic element 10, having a transmission area 21 which stays within the light incident side 11 of the conic element 10. Outside the transmission area 21, the screen has a blocking area 22 of highly reflective material, e.g. silver, aluminum or copper. Light falling on the blocking area 22 is blocked from passing through the screen 20.

The screen 20 forms a wall of a cavity 40. Besides the screen 20, the cavity 40 has inner walls 41 that are highly reflective. A light source 60 is disposed inside the cavity 40. When the light source 60 is operating, the cavity 40 is filled with light travelling in all directions and being reflected from the inner walls 41 of the cavity 40 as well as the blocking area 22. The cavity 40 is suitably shaped, depending on desired applications, like usage as a traffic light, car headlight, projector or LCD backlighting device. The light source 60 is any suitable lamp, e.g. a light bulb, a neon lamp, a mercury-vapor lamp or a cold or hot cathode ray source.

Diffuse light entering the conic element 10 through the transmission area 21 of the screen 20 is collimated by refraction and total reflection at the peripheral surface 13 of the conic element 10, as described above, resulting in a light bundle of narrow angular distribution emanating from the light emitting side 12 of the conic element 10. Preferably, the light incident and emitting sides 11, 12 have areas and the opening angles of the conic element 10 have values that allow for an angular intensity halfwidth of ±15°.

Figure 6:
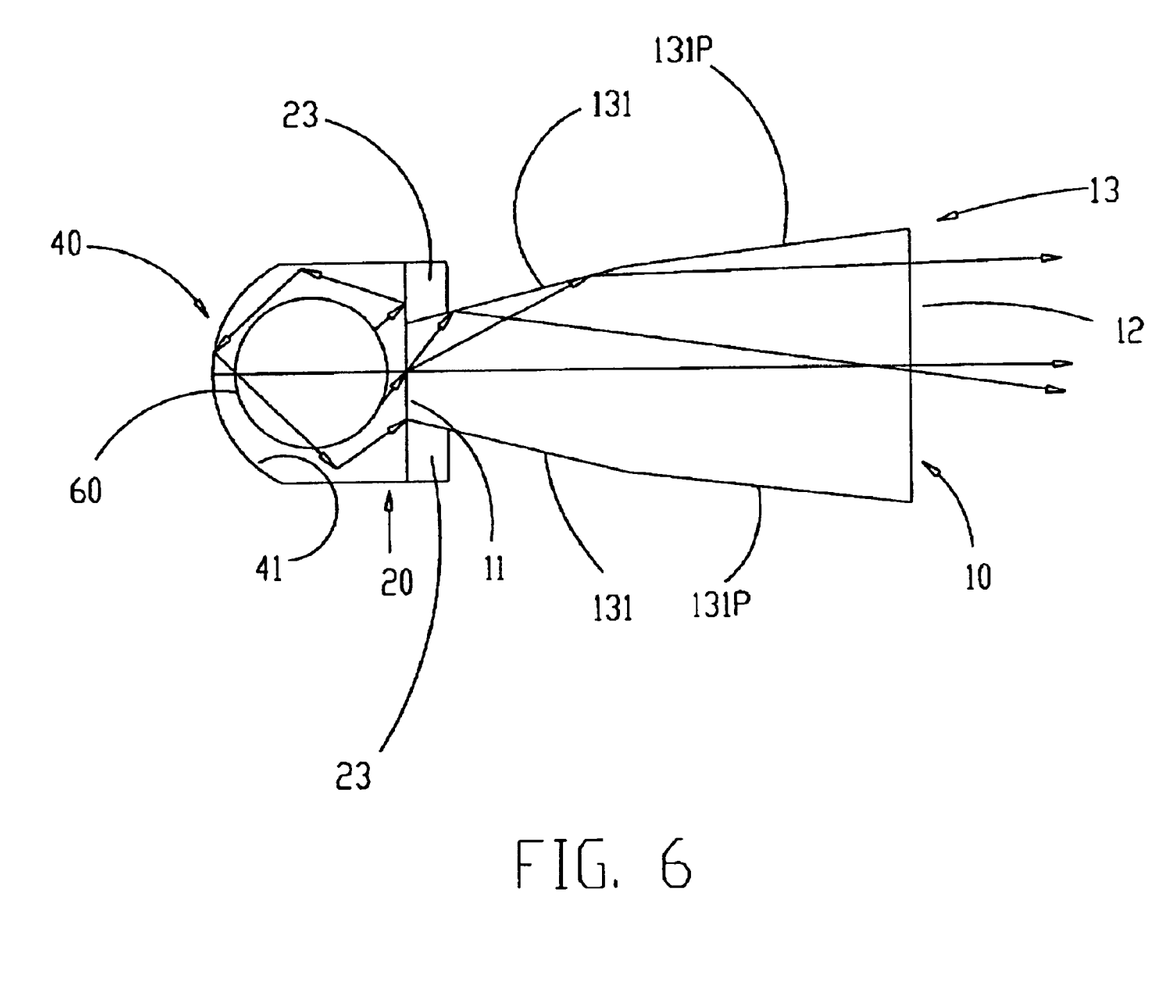
FIG. 6 is a schematic illustration of the present invention in the second embodiment.

Referring to FIG. 6, the present invention in a second embodiment has the conic element 10 attached to the cavity 40 enclosing the light source 60, as in the first embodiment. One side of the cavity 40 is formed by a light blocking plate 23. The light blocking 23 plate has an inner side facing the light source and coated with highly reflective material.

Figure 7:
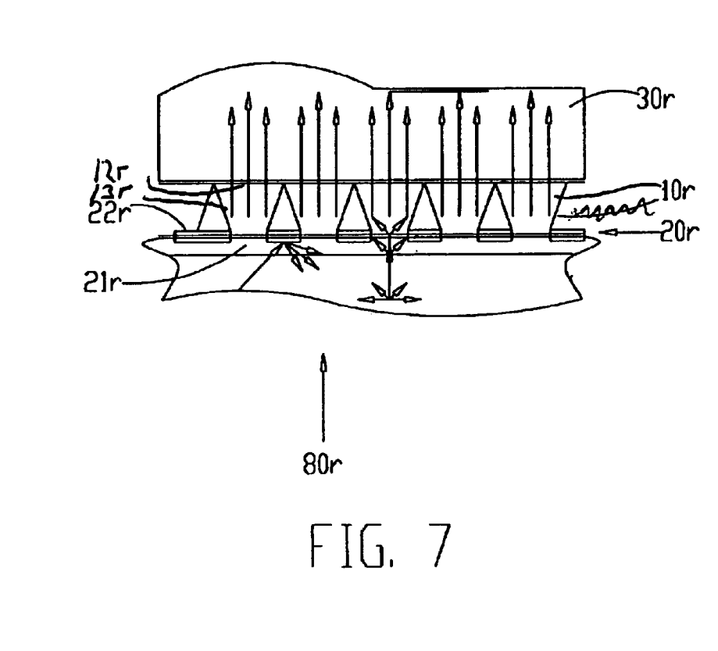
FIG. 7 is a schematic illustration of the present invention in the third embodiment.

Referring to FIG. 7, the present invention in a third embodiment has a transparent substrate 30r defining a substrate plane and a plurality of parallel conic elements 10r disposed thereon, with the light emitting sides 12r of the conic elements 1r being attached to the transparent substrate 30r and the central axes of the conic elements 10r being oriented perpendicular to the substrate plane. Each of the conic elements 10r has a length and a width of less than 2 mm. A screen 20r is set on the plurality of conic elements 10r on the light incident sides 11r thereof, having an array of transmission areas 21r that are covered by the light incident sides 11r of the conic elements 10r. Outside the transmission areas 21r, the screen has a blocking area 22r of highly reflective material. Light falling on the blocking area 22r is blocked from passing through the screen 20r. The screen 20r, the plurality of conic elements 10r and the transparent substrate 30r form a light collimating plate 80r, which has a main axis of light propagation parallel to the central axes of the conic elements 10r thereof.

Diffuse light entering the conic elements 10r through the transmission areas 21r of the screen 20r is collimated by refraction and total reflection at the peripheral surfaces 13r of the conic elements 10r, resulting in light bundles with narrow angular distributions centered around the main axis of the collimating plate 80r.

Figure 8:
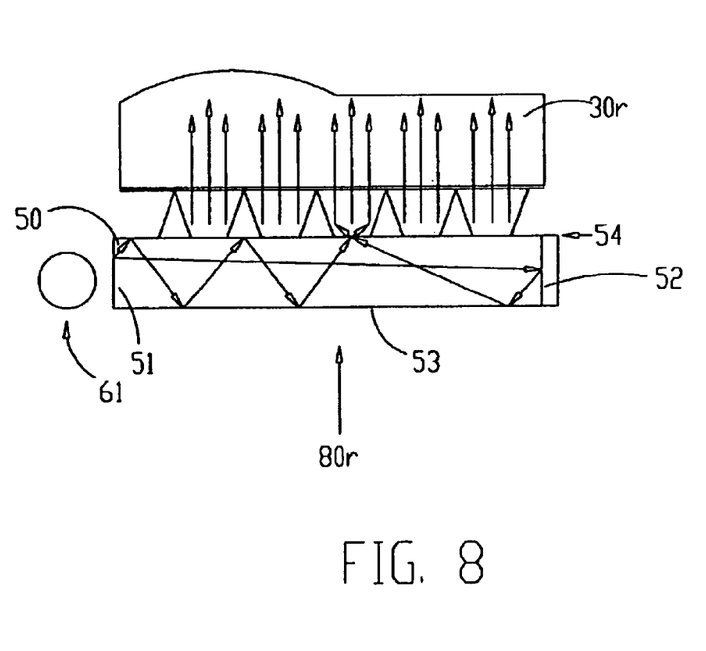
FIG. 8 is a schematic illustration of the present invention in the fourth embodiment.

Referring to FIG. 8, the present invention in a fourth embodiment in addition to the third embodiment has a light guide 50, having a first end 51 at which a light source assembly 61 is disposed, a second end 52 with a surface of highly reflective material, a diffuse reflecting side 53 between the first and second ends and a light escaping side 54 opposite thereto. The light escaping side 54 of the light guide 50 is formed by the light collimating plate 80r. When the light source assembly 61 is operating, the light guide 50 is filled with light travelling in all directions and being reflected from the second end 52 and the diffuse reflecting side 53 of the light guide 50 as well as the blocking area 22r. Diffuse light passes through the transmission areas 21r of the screen 20r and emanates from transparent substrate 30r in bundles of narrow angular distributions around the main axis of light propagation of the collimating plate 80r.

Figure 9A:
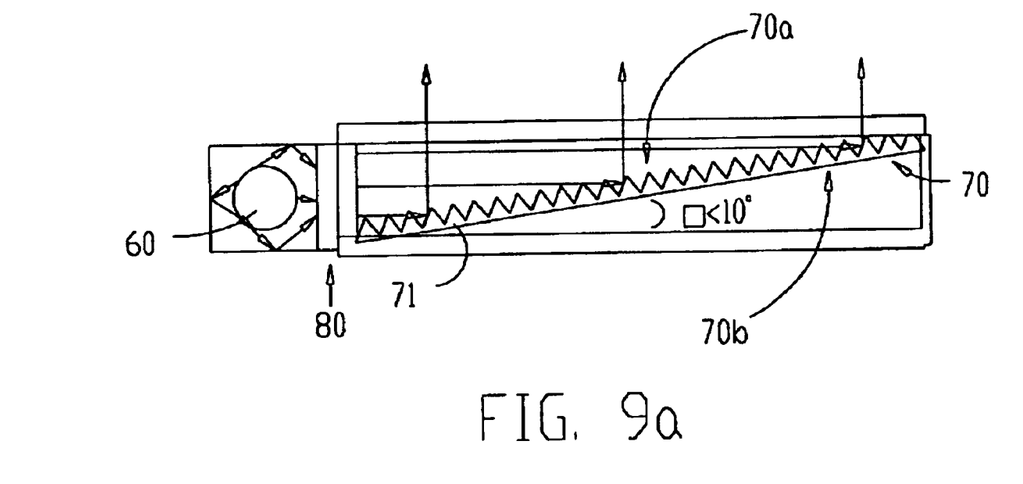
FIGS. 9a and 9b are schematic illustrations of the present invention in the fifth embodiment.

Referring to FIG. 9a, the present invention in a fifth embodiment in addition to the fourth embodiment has a reflecting plate 70. The reflecting plate 70 in turn has a reflecting side 70a carrying a series of triangular prisms 71 coated by highly reflective material and running parallel to one another and a flat back side 70b. Light generated by the light source 60 and emanating from the light collimating plate 80 travels roughly parallel to the main axis of light propagation thereof and is reflected by the reflecting plate 70 by 90°. Preferably, the reflecting plate 70 is inclined against the main axis of the light collimating plate 80 by a small angle α<10°. Thus collimated light is generated across a relatively large area, which is advantageous for use in conjunction with LCDs.

Figure 9B:
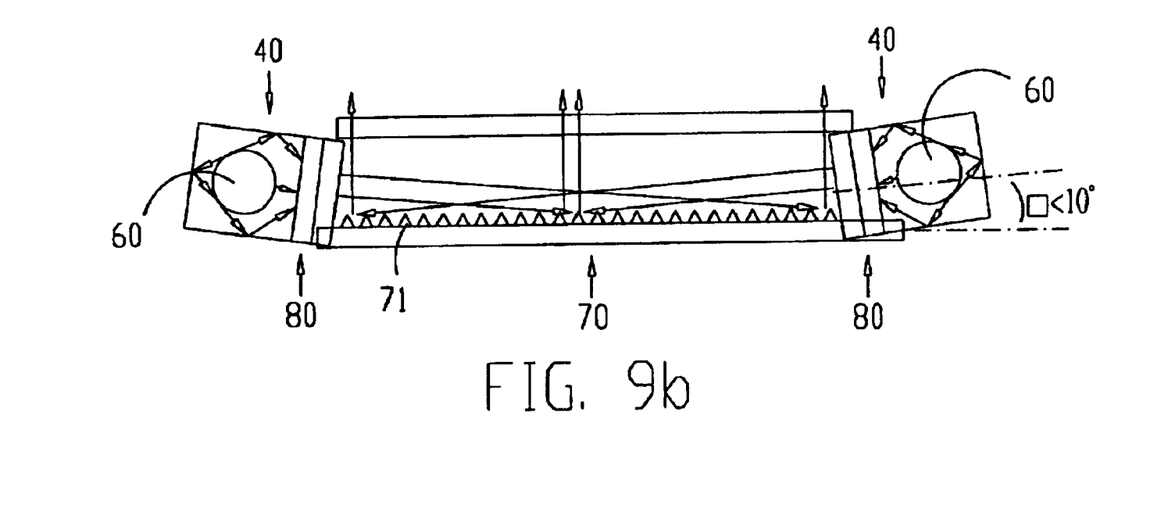

Alternatively, as shown in FIG. 9b, two arrangements, each having a light source 60, a cavity 40 and a collimating plate 80 are employed, being symmetrically disposed on two opposing sides of the reflecting plate 70, with the main axes of light propagation of the light collimating plates 80 being inclined against the reflecting plate 70 by small angles α<10°.

Figure 10:
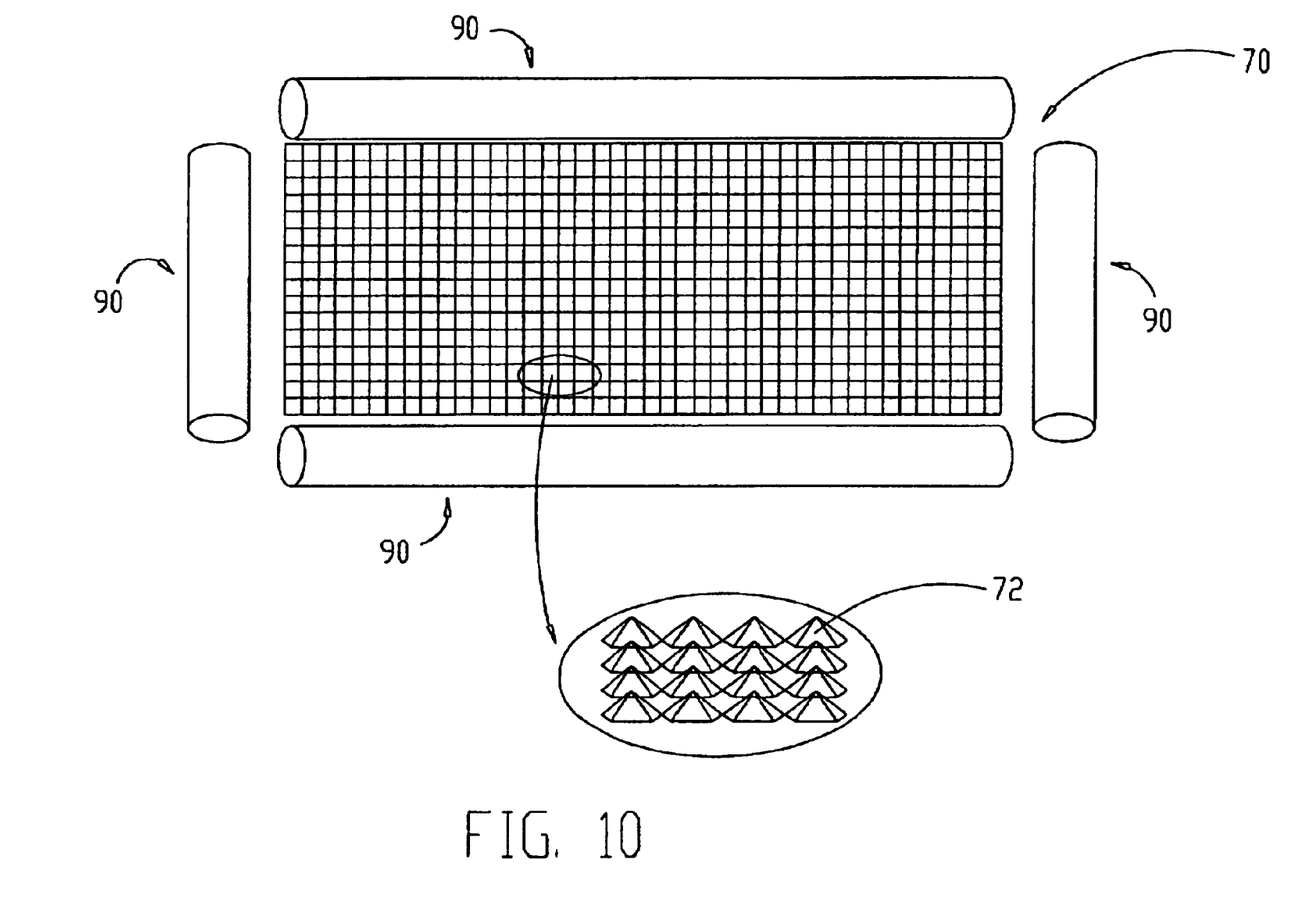
FIG. 10 is a schematic illustration of the present invention in the sixth embodiment.

Referring to FIG. 10, in a sixth embodiment of the present invention, the reflecting plate 70 has a reflecting side carrying a two-dimensional arrangement of pyramidal reflecting elements 72, each of the pyramidal reflecting elements 72 having a rectangular base and being coated on all sides by highly reflective material. As shown in FIG. 9b four arrangements 90, each having a light source 60, a cavity 40 and a collimating plate 80 are symmetrically disposed on four sides of the reflecting plate 70, with the main axes of light propagation of the light collimating plates 80 being inclined against the reflecting plate 70 by small angles α<10°.

By decreasing the opening angles and widening the light incident sides of the conic elements 10 of the present invention, light is emitted in a wider bundle, e.g. at an angular intensity halfwidth of ±25°, so that a versatile wide-bundle light source is created.

Figure 11:
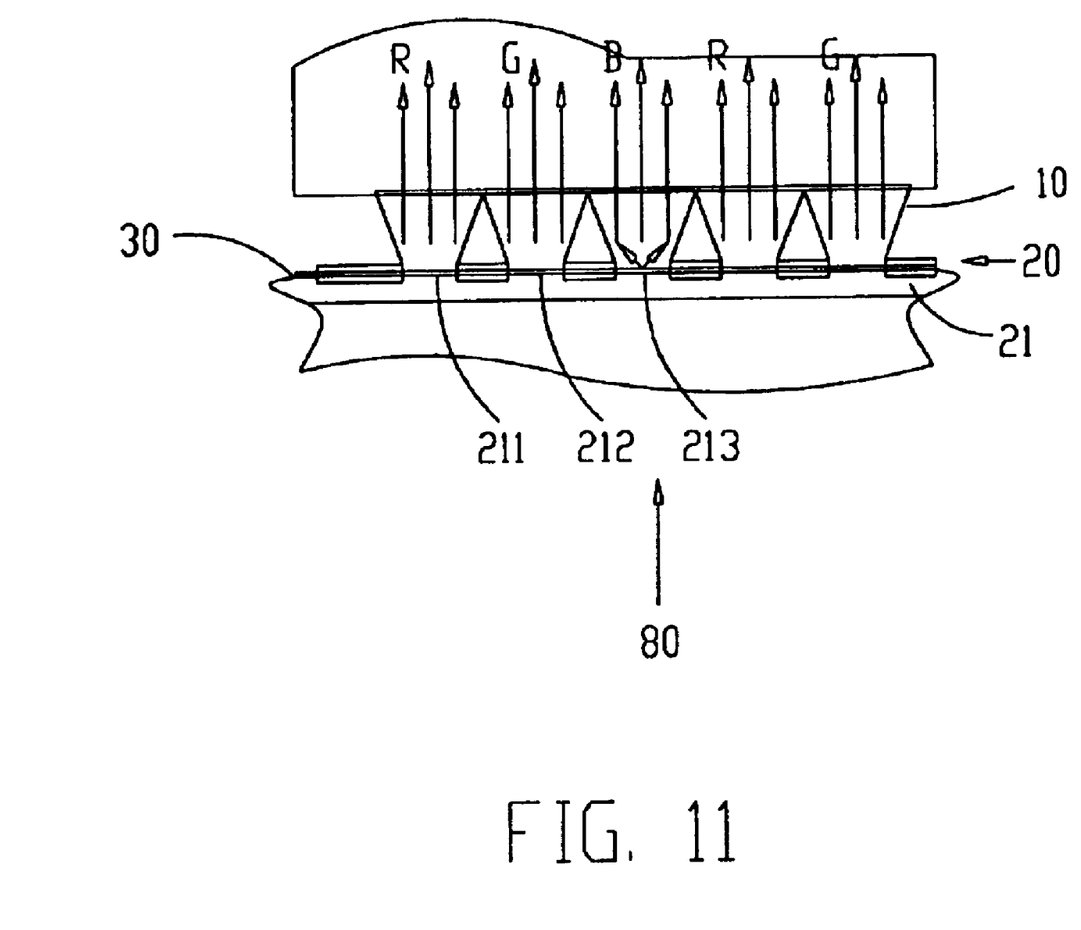
FIG. 11 is a schematic illustration of the present invention in the seventh embodiment.

Referring to FIG. 11, in a seventh embodiment of the present invention, R.G.B. color filters 211, 212, 213 are attached to the transmission areas 21 of the screen 20, so that a color-selective light collimating system is created and no further color filters are required, which is advantageous for use in conjunction with R.G.B. color LCDs.

While the invention has been described with reference to preferred embodiments thereof, it is to be understood that modifications or variations may be easily made without departing from the spirit of this invention which is defined by the appended claims.

What is claimed is:

1. A light collimating system, comprising:
   a plurality of conic elements, each of said conic elements being centered around a central axis which defines a longitudinal direction, and having a length and a width of less than 2 mm, further having a transverse flat light emitting side and a light incident side parallel to said light emitting side and being smaller than said light emitting side, said light incident sides and said light emitting sides of said conic elements respectively lying in common planes;
   a screen connected to said light incident sides of said conic elements, said screen being divided into transmission areas that are completely covered by said light incident sides of said conic elements and a blocking area made of highly reflective material; and
   a transparent substrate to which said light emitting sides of said conic elements are attached;
   wherein said plurality of conic elements, said screen and said transparent substrate form a light collimating plate having a main axis of light propagation parallel to said central axes of said plurality of conic elements and wherein said light incident side and said light emitting side of each of said conic elements have areas and an opening angle that allow for a narrow angular intensity distribution of emanating light.

2. The light collimating system according to claim 1, wherein said light emitting side and said light incident side of each of said conic elements is shaped like a strip, a rectangle, a square, a polygon, a circle, or an oval.

3. The light collimating system according to claim 1, wherein each of said conic elements further comprises at least one conic segment having a common peripheral surface that is inclined against said central axis and for each longitudinal position has an opening angle of between 1° and 60° which decreases towards said light emitting side, while within each of said conic segments either staying constant or decreasing towards said light emitting side.

4. The light collimating system according to claim 3, wherein for each of said conic elements said light incident side and light emitting side have areas and said opening angle has values that allow for a widened angular intensity distribution of emanating light.

5. The light collimating system according to claim 1, wherein said light incident side of said conic element is enclosed by a light blocking plate which is made of highly reflective material.

6. The light collimating system according to claim 1, further comprising:
   a cavity set on said plurality of conic elements at said light incident sides thereof, bordered by said screen and having inner walls made of highly reflective material; and
   a light source inside said cavity.

7. The light collimating system according to claim 1, further comprising:
   a light guide having a first end, a second end with a surface of highly reflective material, a diffuse reflecting side between said first and second ends and a light escaping side opposite thereto on which said plurality of conic elements at said light incident sides thereof are set; and
   a light source assembly at said first end of said light guide.

8. The light collimating system according to claim 1, further comprising a reflecting plate which has a reflecting side carrying a series of parallel triangular prisms coated by highly reflective material and positioned and oriented to reflect light from said light collimating plate by 90°, wherein by a suitably small angle of inclination of said reflecting plate against said main axis of light propagation of said light collimating plate collimated light emanating from a large area is generated.

9. The light collimating system according to claim 8, wherein said light collimating plate is divided into a first light collimating plate and a second light collimating plate mounted on two opposite sides of said reflecting plate.

10. The light collimating system according to claim 8, wherein said light collimating plate is divided into a first light collimating plate, a second light collimating plate, a third light collimating plate and a fourth light collimating plate mounted on four sides of said reflecting plate and said reflecting side of said reflecting plate carries a two-dimensional arrangement of pyramidal reflecting elements, each of said pyramidal reflecting elements having a rectangular base, being coated on all sides by highly reflective material and positioned and oriented to reflect light from said first, second, third and fourth light collimating plates by 90°.

11. The light collimating system according to claim 1, wherein RGB color filters are attached to said transmission areas of said screen.

12. A light collimating system, comprising:

a plurality of conic elements, each of said conic elements being centered around a central axis which defines a longitudinal direction, and having a length and a width of less than 2 mm, further having a transverse flat light emitting side and a light incident side parallel to said light emitting side and being smaller than said light emitting side, said light incident sides and said light emitting sides of said conic elements respectively lying in common planes;

said light incident sides of said conic elements serve as a screen, said screen being divided into transmission areas that are completely covered by said light incident sides of said conic elements and a blocking area made of highly reflective material; and a transparent substrate to which said light emitting sides of said conic elements are attached;

wherein said plurality of conic elements, said screen and said transparent substrate form a light collimating plate having a main axis of light propagation parallel to said central axes of said plurality of conic elements and wherein said light incident side and light emitting side have areas and an opening angle that allow for a narrow angular intensity distribution of emanating light.

13. The light collimating system according to claim 12, wherein said light emitting side and said light incident side of each of said conic elements is shaped like a strip, a rectangle, a square, a polygon, a circle, or an oval.

14. The light collimating system according to claim 12, wherein each of said conic elements further comprises at least one conic segment having a common peripheral surface that is inclined against said central axis and for each longitudinal position has an opening angle of between 1° and 60° which decreases towards said light emitting side, while within each of said conic segments either staying constant or decreasing towards said light emitting side.

15. The light collimating system according to claim 14, wherein for each of said conic elements said light incident side and light emitting side have areas and said opening angle has values that allow for a widened angular intensity distribution of emanating light.

16. The light collimating system according to claim 12, further comprising:

a light guide having a first end, a second end with a surface of highly reflective material, a diffuse reflecting side between said first and second ends and a light escaping side opposite thereto on which said plurality of conic elements at said light incident sides thereof are set; and a light source assembly at said first end of said light guide.

17. The light collimating system according to claim 12, further comprising a reflecting plate which has a reflecting side carrying a series of parallel triangular prisms coated by highly reflective material and positioned and oriented to reflect light from said light collimating plate by 90°, wherein by a suitably small angle of inclination of said reflecting plate against said main axis of light propagation of said light collimating plate collimated light emanating from a large area is generated.

18. The light collimating system according to claim 17, wherein said light collimating plate is divided into a first light collimating plate and a second light collimating plate mounted on two opposite sides of said reflecting plate.

19. The light collimating system according to claim 17, wherein said light collimating plate is divided into a first light collimating plate, a second light collimating plate, a third light collimating plate and a fourth light collimating plate mounted on four sides of said reflecting plate and said reflecting side of said reflecting plate carries a two-dimensional arrangement of pyramidal reflecting elements, each of said pyramidal reflecting elements having a rectangular base, being coated on all sides by highly reflective material and positioned and oriented to reflect light from said first, second, third and fourth light collimating plates by 90°.

20. The light collimating system according to claim 12, wherein RGB color filters are attached to said transmission areas of said screen.

* * * * *